US008433565B2

(12) United States Patent
Lee et al.

(10) Patent No.: US 8,433,565 B2
(45) Date of Patent: Apr. 30, 2013

(54) WIDE-BAND SPEECH SIGNAL COMPRESSION AND DECOMPRESSION APPARATUS, AND METHOD THEREOF

(75) Inventors: Woo-suk Lee, Seoul (KR); Ho-chong Park, Seongnam-si (KR); Chang-yong Son, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 2178 days.

(21) Appl. No.: 10/891,423

(22) Filed: Jul. 15, 2004

(65) Prior Publication Data

US 2005/0027516 A1 Feb. 3, 2005

(30) Foreign Application Priority Data

Jul. 16, 2003 (KR) ........................ 10-2003-0048665

(51) Int. Cl.
*G01L 19/02* (2006.01)
*G01L 19/00* (2006.01)

(52) U.S. Cl.
USPC .......................................... 704/229; 704/219

(58) Field of Classification Search ........................ None
See application file for complete search history.

(56) References Cited

U.S. PATENT DOCUMENTS 4,949,383 A * 8/1990 Koh et al. ..................... 704/229
6,353,808 B1 * 3/2002 Matsumoto et al. .......... 704/230
6,526,384 B1 2/2003 Mueller et al.

FOREIGN PATENT DOCUMENTS

JP 2001-519552 10/2001
WO 02/33696 4/2002

OTHER PUBLICATIONS

Dunlop et al, "A Packet Based System for Cellular Digital Mobile Radio Applications", Proceedings of the IEEE International Conference on Selected Topics in Wireless Communications, 1992, pp. 27-30.*

Bernhard Grill, "A Bit Rate Scalable Perceptual Coder for MPEG-4 Audio", Audio Engineering Society, Convention Preprint, Sep. 26, 1997, XP002302435, New York.

J.R. Epps et al., "A New Very Low Bit Rate Wideband Speech Coder With a Sinusoidal Highband Model", ISCAS 2001, Proceedings of the 2001 IEEE International Symposium on Circuits and Systems, Sydney, Australia, May 6-9, 2001, IEEE International Symposium on Circuits and Systems, New York, IEEE, US, vol. 1 of 5, May 6, 2001, pp. 349-352, XP010540650, ISBN: 0-7803-6685-9.

Sean Ramprashad, "A Two Stage Hybrid Embedded Speech/Audio Coding Structure", Acoustics, Speech and Signal Processing, 1998, Proceedings of the 1998 IEEE International Conference on Seattle, WA, USA May 12-15, 1998, New York, USA, IEEE, US, May 12, 1998, pp. 337-340, XP010279163, ISBN 0-7803-4428-6.

Per Ekstrand, "Bandwidth Extension of Audio Signals by Spectral Band Replication", IEEE Benelux Workshop on Model Based Processing and Coding of Audio, Nov. 15, 2002, pp. 53-58, XP000962047.

(Continued)

*Primary Examiner* — Samuel G Neway
(74) *Attorney, Agent, or Firm* — Staas & Halsey LLP

(57) ABSTRACT

An apparatus to compress a wide-band speech signal, the apparatus including a narrow-band speech compressor to compress a low-band speech signal of the wide-band speech signal and output the compressed low-band speech signal as a low-band speech packet; and a high-band speech compressor to compress a high-band speech signal of the wide-band speech signal using energy information of the low-band speech signal provided from the narrow-band speech compressor, and outputs the compressed high-band speech signal as a high-band speech packet.

43 Claims, 10 Drawing Sheets

OTHER PUBLICATIONS

Toshiyuki Nomura et al., "A Bitrate and Bandwidth Scalable CELP Coder", Acoustics, Speech and Signal Processing, 1998, Proceedings of the 1998 IEEE International Conference on Seattle, WA, USA, May 12-15, 1998, New York, USA, IEEE, May 12, 1998, pp. 341-344, XP010279059, ISBN: 0-7803-4428-6.

Kazuhito Koishida et al., "A 16-Kbit/s Bandwidth Scalable Audio Coder Based on the G.729 Standard", IEEE ICASSP 2000, vol. 2, Jun. 5, 2000, pp. 1149-1152, XP010504931.

Jurgen Herre et al., "Overview of MPEG-4 Audio and Its Applications in Mobile Communications", Proceedings of $16^{th}$ International Conference on Communication Technology ICCT 2000, vol. 1, Aug. 21, 2000, pp. 604-613, XP010526820.

European Search Report, issued Oct. 26, 2004.

"An Attack Detection Method for Scalable Coding Using Excitation Gain" p. 181, System 1, Electronic, Information, and Communication Conference Thesis Collection, Mar. 7, 2002.

Japanese Office Action dated Jul. 13, 2010, issued in Japanese Application No. 2004-208615.

* cited by examiner

WIDE-BAND SPEECH SIGNAL COMPRESSION AND DECOMPRESSION APPARATUS, AND METHOD THEREOF

CROSS-REFERENCE TO RELATED APPLICATIONS

This application claims the benefit of Korean Patent Application No. 2003-48665, filed on Jul. 16, 2003, in the Korean Intellectual Property Office, the disclosure of which is incorporated herein by reference

BACKGROUND OF THE INVENTION

1. Field of the Invention

The present invention relates to encoding and decoding of a speech signal, and, more particularly, to a wide-band speech signal compression apparatus to compress a speech signal in a scalable bandwidth structure, a wide-band speech signal decompression apparatus to decompress the compressed speech signal, and a method thereof.

2. Description of the Related Art

An existing communication method based on Public Switched Telephone Network (PSTN) samples a speech signal at 8 kHz and transmits a speech signal with a bandwidth of 4 kHz. Accordingly, such a PSTN-based communication method cannot transmit speech signals of a frequency beyond 4 kHz, which deteriorates the voice quality of the speech signal.

To solve such a problem, a packet-based wide-band speech signal compression apparatus that samples a received speech signal at 16 kHz, and provides a speech signal with a bandwidth of 8 kHz, has been developed. However, although the quality of the speech signal improves as the bandwidth of the speech signal increases, the amount of data transmission of the communication channel increases. Therefore, to efficiently operate the wide-band speech signal compression apparatus, an adequate communication channel for transmitting large amounts of data should be ensured.

However, the amount of data transmission on the packet-based communication channel may be changed according to various factors. Accordingly, the adequate communication channel required by the wide-band speech signal compression apparatus may not be ensured, which can deteriorate the voice quality of the speech signal. That is, if the amount of data transmission on the communication channel is not enough at a specific moment, the speech packet is lost during transmission, so that the speech signal cannot be transmitted.

Accordingly, a technique which compresses speech signals by a scalable bandwidth has been proposed. An example of such a technique is ITU standard G.722. The ITU standard G.722 proposes a method that divides a received speech signal into two bands, using a low-pass filter and a high-pass filter, and compresses the respective bands individually. In the ITU standard G.722, the signals are compressed according to an Adaptive Differential Pulse Sign Modulation (ADPCM) method. However, the compression method proposed in the ITU standard G.722 has a very high data transmission rate.

Also, the ITU standard G.722.1 discloses a technique that converts a wide-band signal into a frequency-domain signal, divides the frequency-domain signal into several sub-band signals, and compresses the respective sub-band signals. However, the ITU standard G.722.1 is not compatible with a standard narrow-band speech signal compression apparatus, and it also does not construct a speech packet in a scalable bandwidth structure.

A conventional wide-band speech signal compression technique, developed to be compatible with a standard narrow-band speech signal compression apparatus, passes a wide-band speech signal through a low-pass filter to obtain a narrow-band speech signal, encodes the narrow-band speech signal using a standard narrow-band speech signal compressor, and compresses a high-band speech signal using a separate method. Here, packets of the narrow-band speech signal and the high-band speech signal are transmitted in a scalable structure.

A conventional technique for processing a high-band speech signal divides a high-band speech signal into a plurality of sub-band signals using a filter-bank, and compresses the respective sub-band signals. Another conventional technique for compressing a high-band speech signal converts the high-band speech signal into a frequency-domain signal by discrete cosine transform (DCT) or discrete Fourier transform (DFT) and quantizes the generated frequency coefficients individually.

However, since such wide-band speech signal compression techniques having a scalable bandwidth structure do not use the characteristics of the narrow-band speech signal when compressing the high-band speech signal, they have a low compression efficiency.

Also, since these wide-band speech signal compression techniques quantize all frequency coefficients converted to a frequency domain without efficient use of the correlation of intra-band and inter-band, they have a low quantization efficiency and a low prediction performance in decompressing information not transmitted when the signal was compressed.

SUMMARY OF THE INVENTION

The present invention provides a wide-band speech signal compression apparatus that is compatible with a conventional standard narrow-band speech signal compressor, a wide-band speech signal decompression apparatus, and a method thereof.

The present invention also provides a wide-band speech signal compression apparatus and a wide-band speech signal decompression apparatus to compress a high-band speech signal using compression information of a low-band speech signal and decompress the compressed speech signal, when compressing and decompressing a speech signal using a scalable bandwidth structure, respectively, and a method thereof.

The present invention also provides a wide-band speech signal compression apparatus and a wide-band speech signal decompression apparatus to compress a high-band speech signal using a correlation of inter-band and intra-band and decompress the compressed high-band speech signal, and a method thereof.

The present invention also provides a wide-band speech signal compression apparatus and a wide-band speech signal decompression apparatus to respectively quantize frequency coefficients, obtained by converting speech signals to frequency domain signals, differently according to the characteristics of frequency coefficients and their bands when compressing the speech signals, and decompress the compressed speech signals, and a method thereof.

The present invention also provides a speech decompression apparatus to minimize information loss in decompressing, by predicting information not transmitted due to compression by a speech compressor apparatus, and a method thereof.

Additional aspects and/or advantages of the invention will be set forth in part in the description which follows and, in part, will be obvious from the description, or may be learned by practice of the invention.

According to an aspect of the present invention, there is provided an apparatus to compress a wide-band speech signal, the apparatus comprising: a narrow-band speech compressor to compress a low-band speech signal of the wide-band speech signal and output the compressed low-band speech signal as a low-band speech packet; and a high-band speech compressor to compress a high-band speech signal of the wide-band speech signal using energy information of the low-band speech signal provided from the narrow-band speech compressor, and outputs the compressed high-band speech signal as a high-band speech packet.

According to another aspect of the present invention, there is provided an apparatus to decompress a wide-band speech signal, the wide-band speech signal including a compressed low-band speech packet and a compressed high-band speech packet, the apparatus comprising: a narrow-band speech decompressor to decompress the compressed low-band speech packet into a low-band speech signal; a high-band speech decompressor to decompress the compressed high-band speech packet into a high-band speech signal using energy information of the decompressed low-band speech signal provided from the narrow-band speech decompressor; and an adder to add the low-band speech signal output from the narrow-band speech decompressor with the high-band speech signal output from the high-band speech decompressor and output the decompressed wide band speech signal.

According to still another aspect of the present invention, there is provided a method of compressing a wide-band speech signal, the method comprising: receiving the wide-band speech signal and compressing a high-band speech signal of the wide-band speech signal using energy of a low-band signal of the wide-band speech signal; and outputting the compressed high-band speech signal as a high-band speech packet.

According to still yet another aspect of the present invention, there is provided a method of decompressing a compressed wide-band speech signal having a high-band speech packet and a low-band speech packet being compressed with a scalable bandwidth structure, the method comprising: decompressing the low-band speech packet into a low-band speech signal; decompressing the high-band speech packet into a high-band speech signal using energy information of the decompressed low-band speech signal obtained in the decompressing of the low-band speech signal; and adding the low-band speech signal with the high-band speech signal and generating a wide-band decompression signal.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
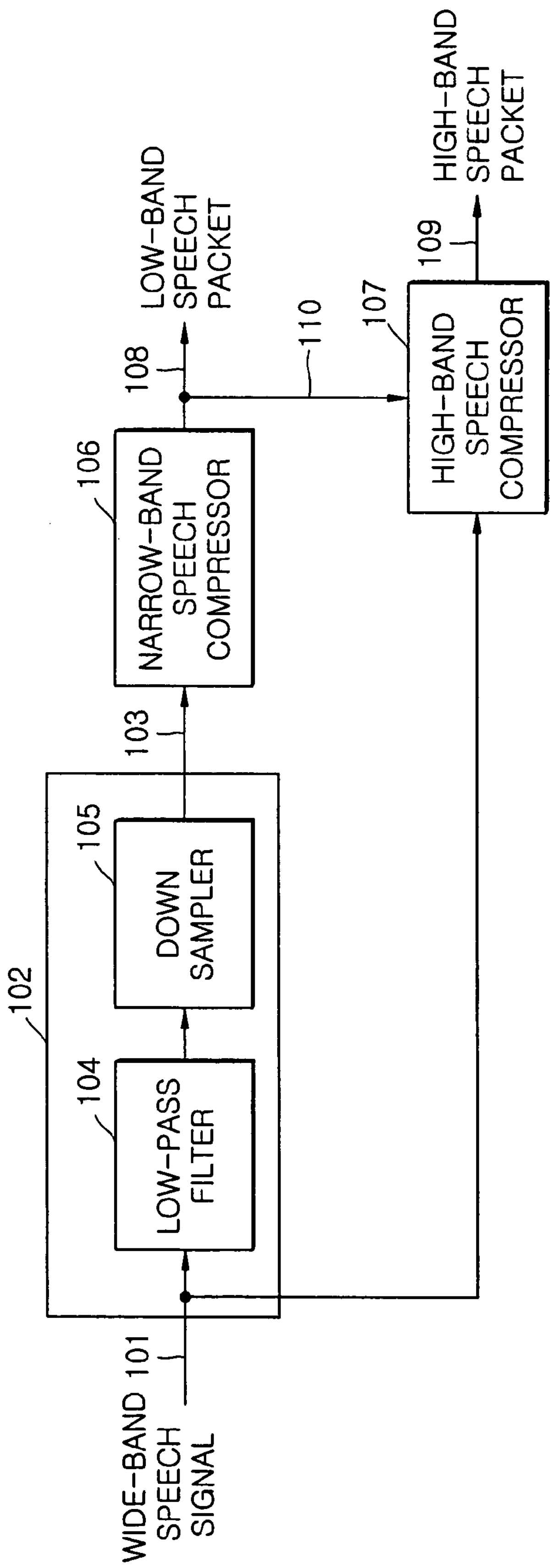
FIG. 1 is a block diagram of a wide-band speech signal compression apparatus according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of a wide-band speech signal compression apparatus according to the present invention. Referring to FIG. 1, the wide-band speech signal compression apparatus includes a first bandwidth conversion unit 102, a narrow-band speech compressor 106, and a high-band speech compressor 107.

The first bandwidth conversion unit 102 converts a wide-band speech signal received via a line 101 into a narrow-band signal. The wide-band speech signal is a signal obtained by sampling an analog signal at 16 kHz and quantizing each sampled signal using 16-bit linear Pulse Code Modulation (PCM).

The first bandwidth conversion unit 102 includes a low-pass filter 104 and a down-sampler 105.

The low-pass filter 104 filters the wide-band speech signal received via the line 101 according to a cut-off-frequency. The cut-off frequency is determined according to the bandwidth of a narrow-band defined according to a scalable bandwidth structure. For example, the cut-off frequency of the low-pass filter 104 is 3700 Hz. However, the low-pass filter is not limited to this cut-off frequency.

The down sampler 105 samples the signal output from the low-pass filter 104 by ½ down-sampling to output a low-band signal of a narrow-band 103. The low-band signal of the narrow-band 103 is output to the narrow-band speech compressor 106.

The narrow-band speech compressor 106 compresses the low-band signal of the narrow-band 103 to output a low-band speech packet 108. The low-band speech packet 108 is transferred to a communication channel (not shown).

The narrow-band speech compressor 106 calculates the energy of the low-band speech signal when compressing the low-band signal of the narrow-band. The energy of the low-band speech signal can be calculated using a method that calculates quantized fixed codebook gains for frames. Information regarding the energy of the low-band speech signal is included in the low-band speech packet 108. The narrow-band speech compressor 106 transmits the low-band speech packet 108, including the energy information of the low-band speech signal, to a communication channel (not shown), and simultaneously provides the energy information of the low-band speech signal to the high-band speech compressor 107 via the line 110.

The high-band speech compressor 107 compresses the high-band speech signal of the wide-band speech signal transmitted via the line 101 to output a high-band speech packet. The high-band speech packet is transferred to a communication channel (not shown) via the line 109.

Figure 2:
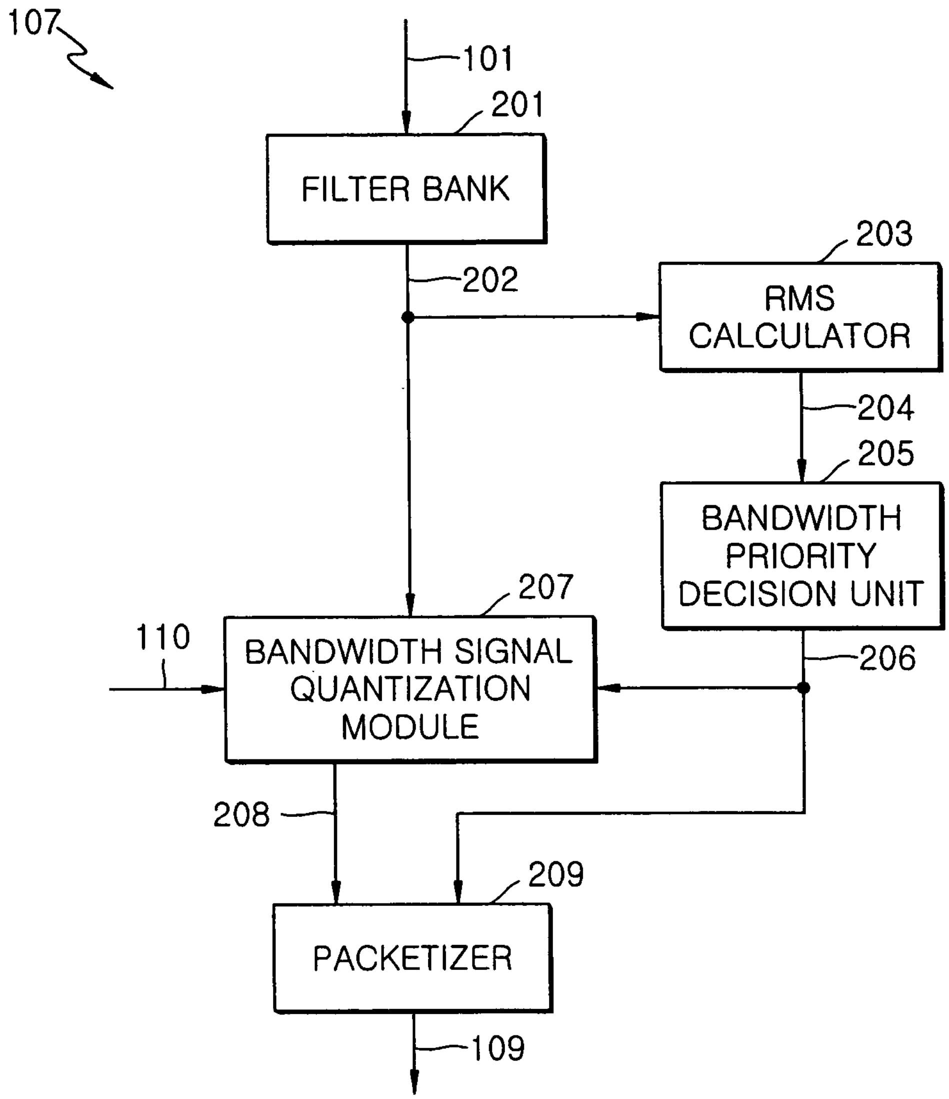
FIG. 2 is a block diagram of a high-band speech compressor shown in FIG. 1.

The high-band speech compressor 107 is shown in FIG. 2. Referring to FIG. 2, the high-band speech compressor 107 includes a filter bank 201, a band Root-Mean-Square (RMS) value calculator 203, a band priority decision unit 205, a band signal quantization module 207, and a packetizer 209.

The filter bank 201 receives a wide-band speech signal from the line 101 and divides the wide-band speech signal into a plurality of band signals. For example, the filter bank 201 can divide the wide-band speech signal into four band signals with different bandwidths, using center frequencies of 4000 Hz, 4800 Hz, 5800 Hz, and 7000 Hz. The filter bank 201 may be an existing Gammatone filter bank.

The filer bank 201 according to an embodiment of the present invention can operate by a 30 msec frame. Each band signal transferred via a line 202 may include 480 samples. The divided bands can be defined as bands 0 through 3.

The RMS value calculator 203 receives the band signals via the line 202 and calculates an RMS value for each of the band signals individually. The calculated RMS values are provided to the band priority decision unit 205 via a line 204.

The band priority decision unit 205 determines a priority of each band according to the magnitude of the RMS values for each of the bands. That is, the band priority decision unit 205 determines a significance of each band according to the magnitude of each band's respective RMS value, and outputs the significance information of each band via a line 206.

The band signal quantization module 207 receives the band signals via the line 202 and quantizes the band signals. When quantizing the band signals, the band signal quantization module 207 uses the significance information of the band transmitted from the band priority decision unit via the line 206 and the energy information of the low-band signal transmitted from the narrow-band speech compressor 106 via the line 110. If the filter bank 201 operates by the 30 msec frame, the band signal quantization module 207 also operates by the 30 msec frame.

Figure 3:
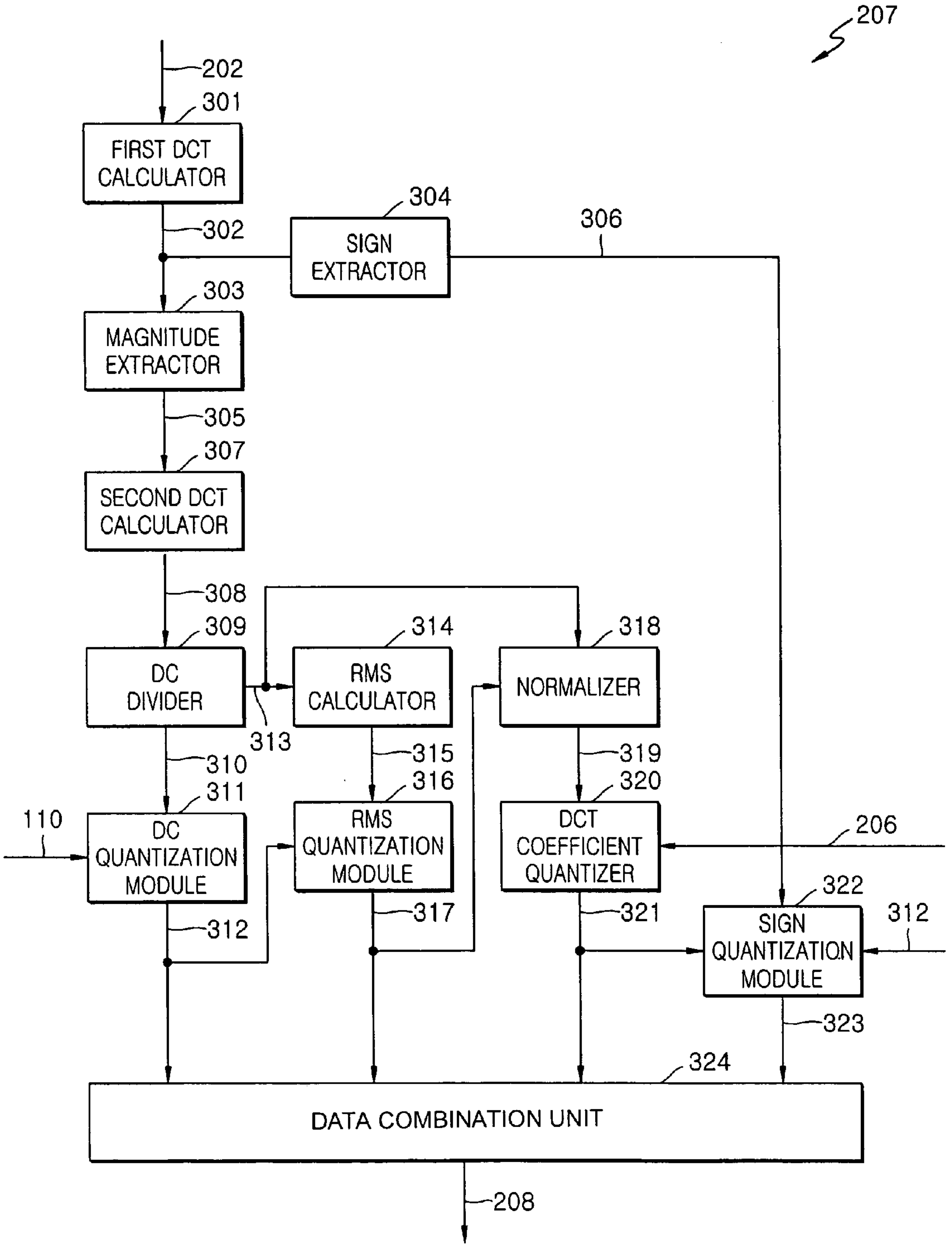
FIG. 3 is a detailed block diagram of a band signal quantization module shown in FIG. 2.

The band signal quantization module 207 is shown in FIG. 3. Referring to FIG. 3, the band signal quantization module 207 includes a first Discrete Cosine Transform (DCT) calculator 301, a magnitude extractor 303, a sign extractor 304, a second DCT calculator 307, a Direct Current (DC) divider 309, a DC quantization module 311, an RMS value calculator 314, an RMS value quantization module 316, a normalizer 318, a DCT coefficient quantizer 320, a sign quantization module 322, and a data combination unit 324.

The first DCT calculator 301 performs a DCT on each band signal to calculate a first DCT coefficient for each band. That is, if each band signal includes 480 samples, the first DCT calculator 301 performs a 480-point DCT on each band signal to obtain a first DCT coefficient for each band. Since each of the band signals is a signal with a specific frequency band, the first DCT coefficients output from the first DCT calculator 301 via a line 302 are limited to DCT coefficients of the corresponding frequency band.

If the filter bank 201 divides the wide-band speech signal into the four band signals with the different bandwidths, as described above with reference to FIG. 2, start indexes and end indexes of the first DCT coefficients among the 480 DCT coefficients for each band which are output from the first DCT calculator 301, and the number of the first DCT coefficients for each band, can be defined as in Table 1. The number of the first DCT coefficients of a band i is denoted by $N_i$.

TABLE 1

| Band | Start index | End index | Number of coefficients |
|---|---|---|---|
| 0 | 220 | 263 | 44 |
| 1 | 264 | 317 | 54 |
| 2 | 318 | 383 | 66 |
| 3 | 384 | 425 | 42 |

The first DCT coefficients for each band are provided to the magnitude extractor 303 and the sign extractor 304 via the line 302. The magnitude extractor 303 extracts the magnitudes of the received first DCT coefficients for each band. The sign extractor 304 extracts the signs of the received first DCT coefficients for each band. The magnitude information of the first DCT coefficients output from the magnitude extractor 303 is transmitted to the second DCT calculator 307 via a line 305. The sign information of the first DCT coefficients output from the sign extractor 304 is transmitted to the sign quantization module 322 via a line 306.

The second DCT calculator 307 calculates second DCT coefficients for each band. Since the number $N_i$ of the first DCT coefficients is different according to each of the bands, the second DCT calculator 307 performs an $N_i$-point DCT according to the number $N_i$ of the first DCT coefficients for each band and calculates second DCT coefficients for each band. The second DCT coefficients for each band are output to the DC divider 309 via a line 308.

The DC divider 309 divides the second DCT coefficients 308 for each band into a DC component and the remaining DCT coefficients, wherein the DC component for each band is the DC component of the second DCT coefficients, and the remaining DCT coefficients are the third DCT coefficients. The DC component of the second DCT coefficients is the DCT coefficient of index 0, and the remaining indexes 1 through $N_i-1$ of the second DCT coefficients correspond to the third DCT coefficients. Accordingly, the number of the third DCT coefficients for each band is $N_i-1$. The DC components are output via a line 310, and the third DCT coefficients are output via a line 313.

Figure 4:
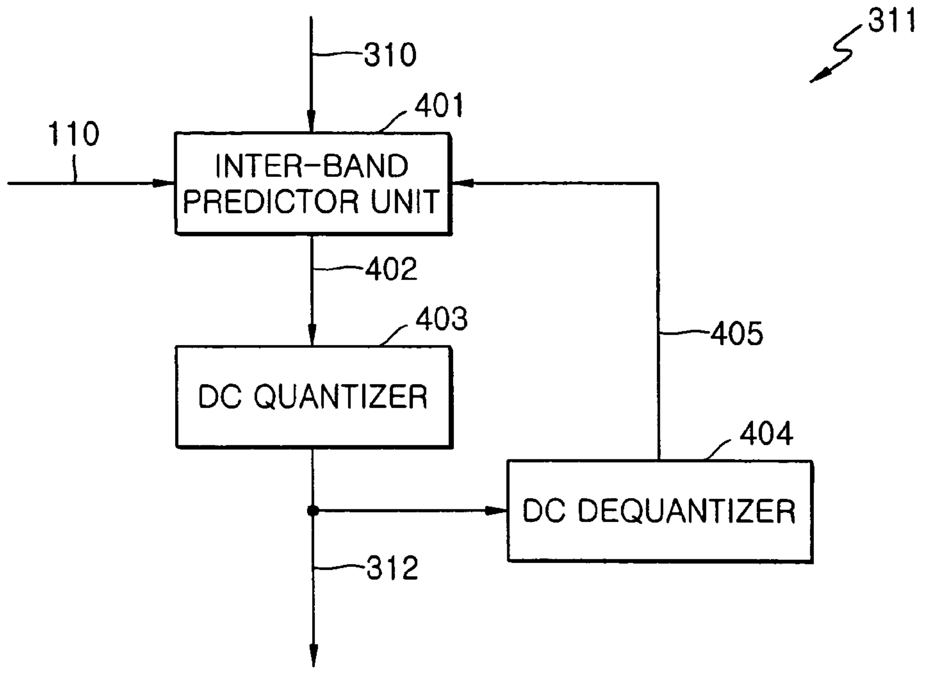
FIG. 4 is a detailed block diagram of a DC quantization module shown in FIG. 3.

The DC quantization module 311 receives and quantizes the DC components of the second DCT coefficients. The DC quantization module 311 is constructed as shown in FIG. 4. Referring to FIG. 4, the DC quantization module 311 includes an inter-band predictor unit 401, a DC quantizer 403, and a DC dequantizer 404.

The inter-band predictor unit 401 performs inter-band prediction for the DC component of each band to compute a DC prediction error. The inter-band predictor unit 401 may be a 1st-order Auto-Regressive (AR) model. Prediction for a first band is performed using quantized energy information of the low-band signal received via the line 110. For example, in a case where a G.729 narrow-band speech compressor is used as the narrow-band speech compressor 106, since an average value of quantized fixed codebook gains for 30 msec corresponds to the quantized energy information of the low-band signal, the inter-band predictor unit 401 computes a DC prediction error of a first band using the average value of the quantized fixed codebook gains. If a log DC value at a band i is $D_i$, a DC prediction error at the band i is $\Delta_i$, and the average value of the quantized fixed codebook gains for 30 msec is $\hat{g}_c$, a DC prediction error $\Delta_0$ at a first band is calculated using the following equation 1.

$$\Delta_0 = D_0 - G\hat{g}_c \tag{1}$$

Here, G is a prediction coefficient, G=1.0 in this embodiment, and $D_0$ is a log DC value at the first band.

Then, DC prediction errors for the remaining bands are computed in order. The DC prediction errors for the remaining bands are detected using equation 2.

$$\Delta_i = D_i - G\hat{D}_{i-1},\ i=1, 2, 3 \tag{2}$$

Here, $\hat{D}_i$ is a dequantized log DC value at the band i, calculated by the DC dequantizer 404, and G is the prediction coefficient, G=1.0 in this embodiment.

The DC quantizer 403 receives and quantizes the DC prediction error. That is, the DC quantizer 403 performs independent scalar quantization for each band according to the statistical characteristic of the DC prediction error received via a line 402 and outputs a DC quantization index via a line 312. The DC quantization index output from the DC quantizer 403 is input to the data combination unit 324 of FIG. 3 and the DC dequantizer of FIG. 4.

The DC dequantizer 404 detects the dequantized log DC value $\hat{D}_i$ required for inter-band DC prediction using the DC quantization index. The dequantized log DC value $\hat{D}_i$ is computed using equation 3. The dequantized log DC value $\hat{D}_i$ is provided to the inter-band predictor unit 401 via a line 405.

$$\hat{D}_0 = \hat{\Delta}_0 + G\hat{g}_c$$

$$\hat{D}_i = \hat{\Delta}_i + G\hat{D}_{i-1}\ i=1, 2, 3 \tag{3}$$

The RMS value calculator 314 of FIG. 3 receives the third DCT coefficients via the line 313 and calculates RMS values of the third DCT coefficients for each band. The RMS values of the third DCT coefficients for each band are provided to the RMS value quantization module 316.

Figure 5:
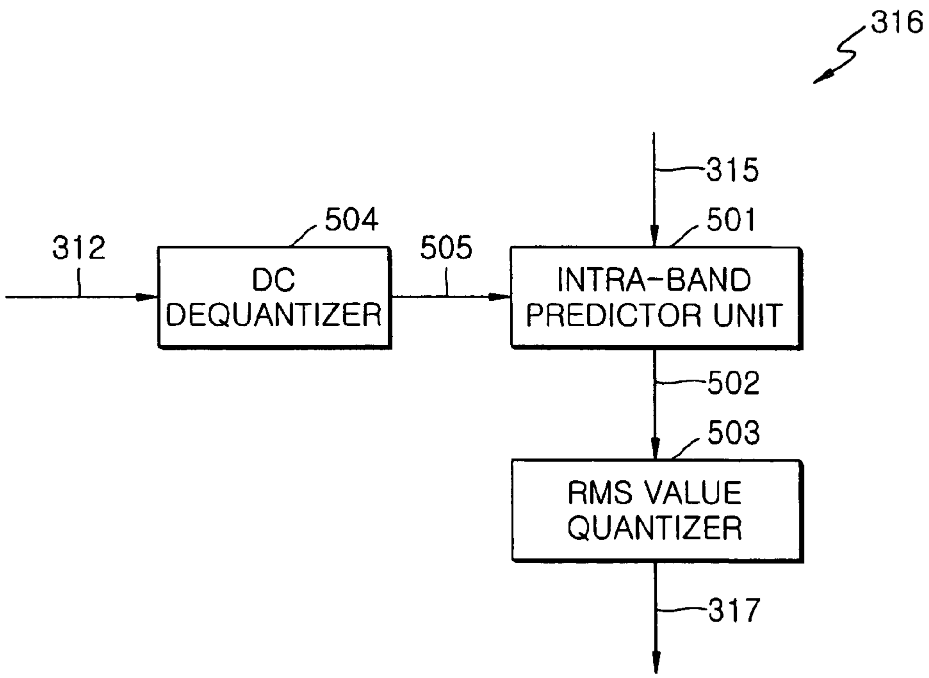
FIG. 5 is a detailed block diagram of an RMS quantization module shown in FIG. 3.

The RMS value quantization module 316 is constructed as shown in FIG. 5. Referring to FIG. 5, the RMS value quantization module 316 includes an intra-band predictor unit 501, a DC dequantizer 504, and an RMS value quantizer 503.

The DC dequantizer 504 performs the same operation as the DC dequantizer 404 of FIG. 4. Accordingly, the DC dequantizer 504 receives a DC quantization index for each band via the line 312 and obtains a dequantized log DC value for each band using the DC quantization index. The dequantized log DC value has the same value as the value output from the DC dequantizer 404 of FIG. 4.

The intra-band predictor unit 501 predicts an RMS value at each band based on the dequantized log DC value for each band received via a line 505 and computes an RMS prediction error. The computed RMS prediction error is output to the RMS value quantizer 503.

The RMS value quantizer 503 quantizes the RMS prediction error and outputs an RMS value quantization index via a line 317. The intra-band predictor unit 501 performs a 1st-order AR model prediction according to equation 4 and obtains an RMS prediction error $\delta_i$.

$$\delta_i = s_i - G\hat{D}_i\ i=0, 1, 2, 3 \tag{4}$$

Here, $s_i$ is the log RMS value at the band i, and G is the prediction coefficient, G=1.0 in this embodiment.

The RMS value quantizer 503 performs scalar quantizations for each band, independently, according to the statistical characteristic of the RMS prediction error, and outputs RMS value quantization indexes via a line 317.

The normalizer 318 of FIG. 3 normalizes the third DCT coefficients received via a line 313 with quantized RMS values for each band. The normalizer 318 obtains the quantized RMS values for each band from the RMS value quantization indexes received via a line 317. The normalizer 318 divides the third DCT coefficients by the quantized RMS values, for each of the bands, respectively, detects normalized third DCT coefficients, and outputs the normalized third DCT coefficients via a line 319.

The DCT coefficient quantizer 320 receives and vector-quantizes the normalized third DCT coefficients and outputs third DCT coefficient quantization indexes via a line 321. That is, the DCT coefficient quantizer 320 splits the third DCT coefficients normalized for each band into a plurality of subvectors and performs vector-quantization for each subvector, using a split vector quantization method.

Also, the DCT coefficient quantizer 320 performs different quantization operations according to the band priority information received via the line 206. That is, the magnitudes of the first DCT coefficients for each band have a high correlation in an intra-band. Due to the high correlation, an energy compaction phenomenon appears significantly in the second DCT coefficients and the third DCT coefficients. Accordingly, the greater part of the energy of the third DCT coefficients is distributed in the DCT coefficients having upper indexes. Therefore, although the third DCT coefficients having lower indexes are removed, and thereby are not transferred, a decompressed speech signal includes little degradation. Accordingly, the DCT coefficient quantizer 320 quantizes the third DCT coefficients of the upper indexes among the third DCT coefficients. Indexes of coefficients to be quantized among the third DCT coefficients of each band are determined according to the band priority information provided via the line 206. The DCT coefficient quantizer 320 quantizes a very small number of the third DCT coefficients at a band with a lowest priority, and quantizes a larger number of the third DCT coefficients at a band with a higher priority.

For example, when performing quantizations for four bands and splitting the third DCT coefficients to be quantized into three sub-vectors, the DCT coefficient quantizer 320 quantizes only an upper sub-vector at a band with a lowest priority, quantizes only two upper sub-vectors at a band with a second lower priority, and quantizes all three sub-vectors at the remaining two bands, on the basis of the band priority information. The entire indexes of the third DCT coefficients for the four bands and the indexes of the three sub-vectors can be defined as in Table 2. As seen in Table 2, the third DCT coefficients having the lower indexes than index 29 are removed and not transferred regardless of their band priorities. This is because the number of the DCT coefficients that are actually quantized at each band is 30.

TABLE 2

| Band | Entire indexes | First sub-vector indexes | Second sub-vector indexes | Third sub-vector indexes |
|---|---|---|---|---|
| 0 | 0-42 | 0-9 | 10-19 | 20-29 |
| 1 | 0-52 | 0-9 | 10-19 | 20-29 |
| 2 | 0-64 | 0-9 | 10-19 | 20-29 |
| 3 | 0-40 | 0-9 | 10-19 | 20-29 |

Figure 6:
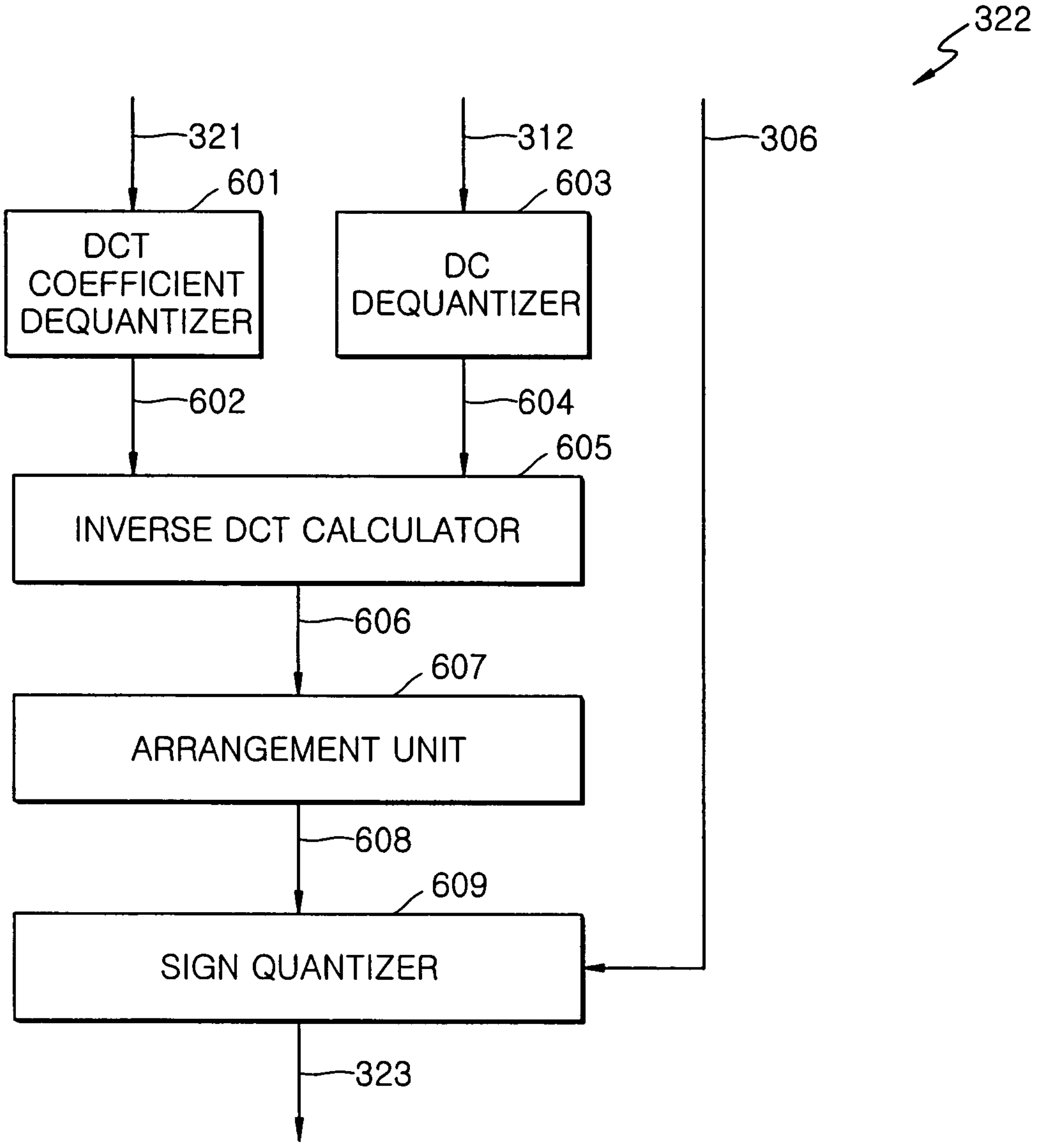
FIG. 6 is a detailed block diagram of a sign quantization module shown in FIG. 3.

The sign quantization module 322 receives and quantizes signs of the first DCT coefficients via a line 306 and outputs sign quantization indexes via a line 323. The sign quantization module 322 is shown in FIG. 6. Referring to FIG. 6, the sign quantization module 322 includes a DCT coefficient dequantizer 601, a DC dequantizer 603, an inverse DCT calculator 605, an arrangement unit 607, and a sign quantizer 609.

The DCT coefficient dequantizer 601 performs dequantization for the third DCT coefficient quantization indexes received via the line 321 and outputs third dequantized DCT coefficients via a line 602.

The DC dequantizer 603 performs DC dequantization for the DC quantization indexes of the second DCT coefficients received via the line 312 and outputs dequantized DC values via a line 604.

The inverse DCT calculator 605 calculates second dequantized DCT coefficients using the third dequantized DCT coefficients and the dequantized DC values of the second DCT coefficients, and obtains magnitudes of the first dequantized DCT coefficients using these second dequantized DCT coefficients. The inverse DCT calculator 605 outputs the magnitudes of the first dequantized DCT coefficients via a line 606.

The arrangement unit 607 obtains order information for the magnitudes of the first DCT coefficients dequantized at each band.

The sign quantizer 609 quantizes signs of the first DCT coefficients with large magnitude among the signs of the first DCT coefficients received via the line 306, on the basis of the order information provided from the arrangement unit 607, and removes and does not transfer the remaining signs. Accordingly, the sign quantizer 609 quantizes a predetermined number of signs of the first DCT coefficients selected based on the magnitude order of the first DCT coefficients, and outputs sign quantization indexes each quantized using one bit via a line 323. Here, the quantized signs are output in the same order as the magnitude order of the first DCT coefficients. Reinsertions of signs when decompressing a speech signal are performed correctly according to this order. Table 3 shows the number of coefficients to be subjected to sign quantization at each of the bands, according to this embodiment of the present invention.

TABLE 3

| Band | The number of entire coefficients | The number of coefficients to be subjected to sign quantization |
|---|---|---|
| 0 | 44 | 30 |
| 1 | 54 | 32 |
| 2 | 66 | 32 |
| 3 | 42 | 21 |

As seen in Table 3, the sign quantizer 609 quantizes signs of coefficients with larger magnitudes among the entire number of coefficients. For example, in a case of band 0 of Table 3, the number of entire DCT coefficients is 44, while the number of DCT coefficients to be subjected to sign quantization is 30. Here, the DCT coefficients to be subjected to sign quantization are the 30 DCT coefficients with the largest magnitude among the 44 DCT coefficients.

The data combination unit 324 of FIG. 3 combines the DC quantization indexes of the second DCT coefficients received via the line 312, the RMS quantization indexes of the third DCT coefficients received via the line 317, the third DCT coefficient quantization indexes received via the line 321, and the sign quantization indexes of the first DCT coefficients received via the line 323 and outputs the combined signal via a line 208.

The packetizer 209 of FIG. 2 packetizes the band priority information output from the band priority decision unit 205 and the combined signal output from the data combination unit 324 to output the packetized signal via a line 109. The packetized signal is a high-band speech packet.

If a band signal for each band includes 480 samples, the numbers of bits assigned to each of the quantization indexes output by quantization according to this embodiment of the present invention can be defined as in Table 4, here the high-band speech packet has a transmission rate of 8 kbps.

TABLE 4

| | Band 0 | Band 1 | Band 2 | Band 3 | Sum |
|---|---|---|---|---|---|
| Band priority | | | | | 4 |
| DC quantization | 6 | 6 | 6 | 6 | 24 |
| RMS quantization | 4 | 4 | 4 | 4 | 16 |
| DCT coefficient quantization | | 9 subvector * 9 bit | | | 81 |
| Sign quantization | 30 | 32 | 32 | 21 | 115 |
| Total | | | | | 240 |

Figure 7:
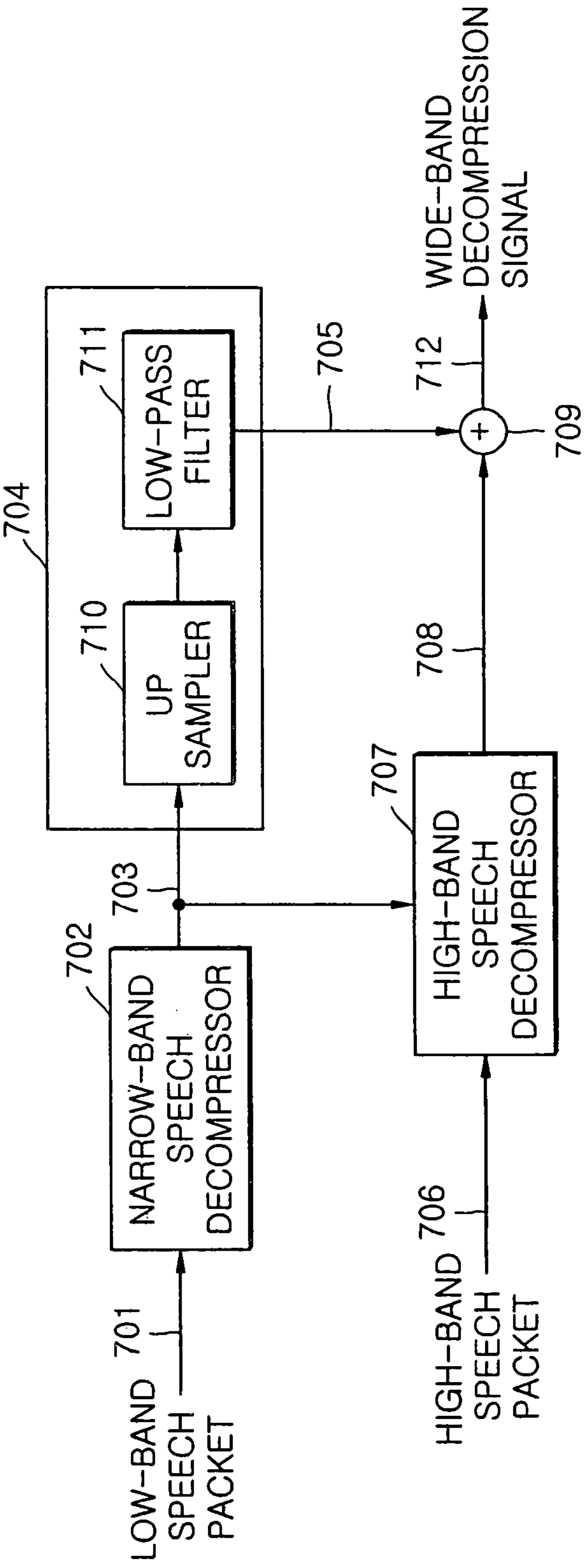
FIG. 7 is a block diagram of a wide-band speech signal decompression apparatus according to an embodiment of the present invention.

FIG. 7 is a block diagram of a wide-band speech signal decompression apparatus according to an embodiment of the present invention. Referring to FIG. 7, the wide-band speech signal decompression apparatus includes a narrow-band speech decompressor 702, a second bandwidth conversion unit 704, a high-band speech decompressor 707, and an adder 709.

The narrow-band speech decompressor 702 is constructed in correspondence to the structure of the narrow-band speech compressor 106 of FIG. 1. The narrow-band speech decompressor 702 receives a low-band speech packet via the line 701 and outputs a decompressed low-band speech signal of the narrow-band via the line 703.

The second bandwidth conversion unit 704 converts the decompressed narrow-band low-band speech signal into a decompressed low-band signal of the wide-band. The second bandwidth conversion unit 704 includes an up-sampler 710 and a low-pass filter 711.

The up-sampler 710 receives a decompressed low-band speech signal of the narrow-band via the line 703 and inserts a zero sample between samples, thereby performing up-sampling. The low-pass filter 711 operates in the same manner as the low-pass filter 104 of FIG. 1.

The high-band speech decompressor 707 receives a high-band speech packet via the line 706 and obtains a decompressed high-band speech signal using energy information of the decompressed low-band signal provided from the narrow-band speech decompressor 702 via the line 703. The high-band speech decompressor 707 is constructed in correspondence to the structure of the high-band speech compressor 107 of FIG. 2.

Figure 8:
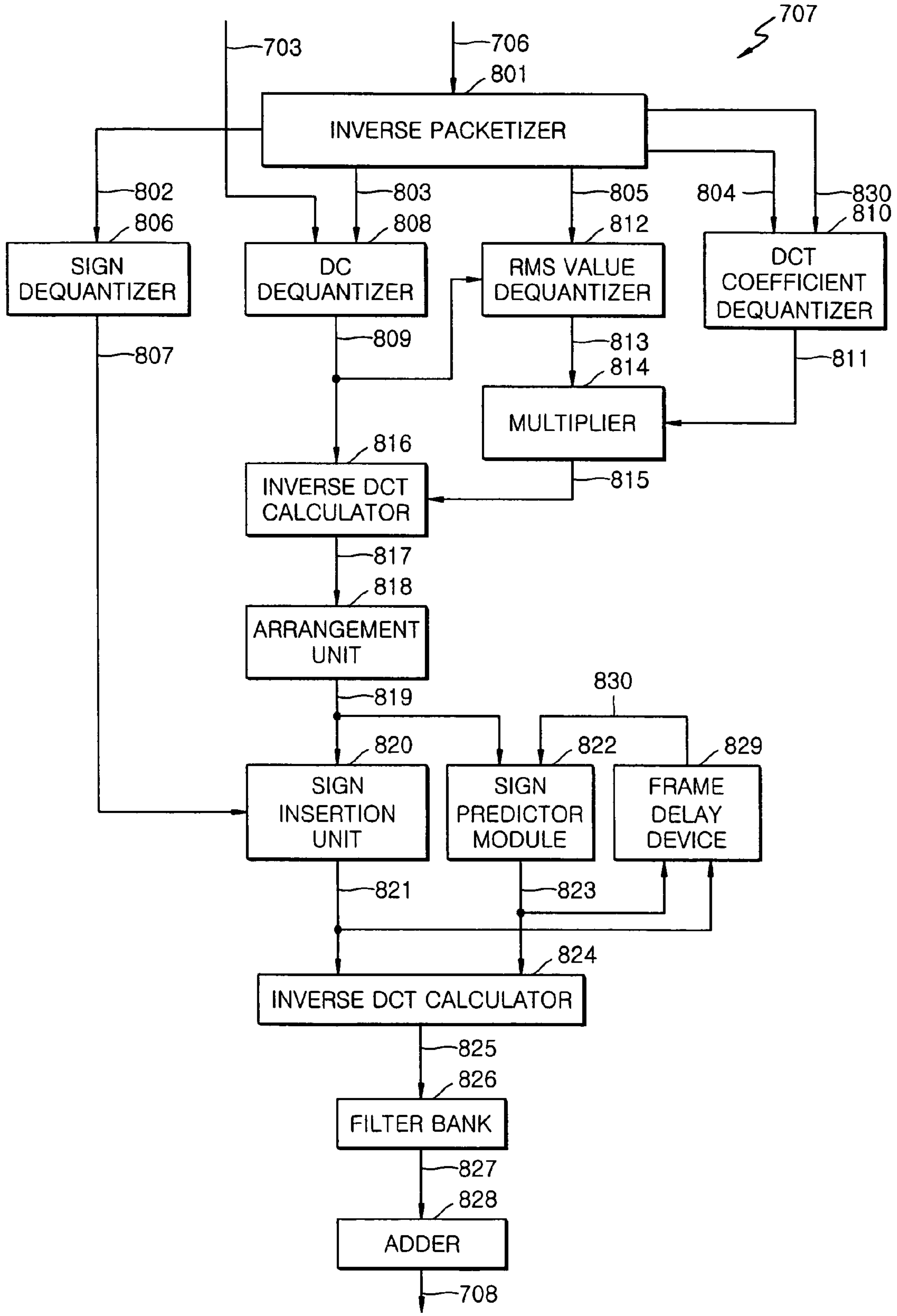
FIG. 8 is a detailed block diagram of a high-band speech decompression apparatus shown in FIG. 7.

The high-band speech decompressor 707 is shown in FIG. 8. Referring to FIG. 8, the high-band speech decompressor 707 includes an inverse packetizer 801, a sign dequantizer 806, a DC dequantizer 808, a DCT coefficient dequantizer 810, an RMS value dequantizer 812, a multiplier 814, an inverse DCT calculator 816, an arrangement unit 818, a sign insertion module 820, a sign predictor module 822, an inverse DCT calculator 824, a filter bank 826, an adder 828, and a frame delay device 829.

The inverse packetizer 801 receives the high-band speech packet via the line 706, splits the quantized indexes according to the respective modules, and outputs the split results to the respective modules.

The sign dequantizer 806 dequantizes sign quantized indexes transferred from the inverse packetizer 801 via the line 802, and outputs the dequantized result as first DCT coefficient signs.

The DC dequantizer 808 outputs quantized DC values of second DCT coefficients using the DC quantized indexes transferred from the inverse packetizer 801 via the line 803 and the energy information of the low-band signal received via the line 703. The DC dequantizer 808 operates in the same manner as the DC dequantizer 404 of FIG. 4.

The DCT coefficient dequantizer 810 outputs normalized and quantized third DCT coefficients 811 using the DCT coefficient quantization indexes provided from the inverse packetizer 801 via the line 804 and the band priority information provided via the line 830. The DCT coefficient dequantizer 810 operates in the same manner as the DCT coefficient dequantizer 601 of FIG. 6.

The RMS value dequantizer 812 outputs RMS values of the third quantized DCT coefficients using RMS quantization indexes provided from the inverse packetizer 801 via the line 805 and the quantized DC values of the second DCT coefficients provided from the DC dequantizer 808 via the line 809. The RMS value dequantizer 812 performs the inverse process of that performed by the RMS value quantization module 316 of FIG. 3. Accordingly, the dequantization process of the RMS value dequantizer 812 is defined by equation 5.

$$-\hat{s}_i=\hat{\delta}_i+G\hat{D}_i \quad i=0, 1, 2, 3 \qquad (5)$$

The multiplier 814 multiplies the third DCT coefficients received via the line 811 by the RMS values of the third DCT coefficients received via the line 813, and obtains third quantized DCT coefficients.

The inverse DCT calculator 816 combines the third quantized DCT coefficients received via the line 815 with the quantized DC values of the second DCT coefficients received via the line 809 and outputs magnitudes of first quantized DCT coefficients. The inverse DCT calculator 816 operates in the same manner as the inverse DCT calculator 605 of FIG. 6.

The DC dequantizer 808, the RMS value dequantizer 812, the DCT coefficient dequantizer 810, the multiplier 814, and the inverse DCT calculator 816 dequantize the band priority information, the third DCT quantization indexes, the DC quantization indexes of the second DCT coefficients, and the RMS quantization indexes of the third DCT coefficients to obtain dequantized DCT values. The above-mentioned units can be defined as an inverse DCT calculation module for obtaining the magnitudes of first quantized DCT coefficients using the quantized DCT values.

The arrangement unit 818 receives the magnitudes of the first quantized DCT coefficients via the line 817 and obtains order information for the magnitudes of the first quantized DCT coefficients.

The sign insertion unit 820 inserts the first DCT coefficient signs transmitted via the line 807 to the magnitudes of the first DCT coefficients in the magnitude order of the first DCT coefficients using the order information provided from the arrangement unit 818.

Figure 9:
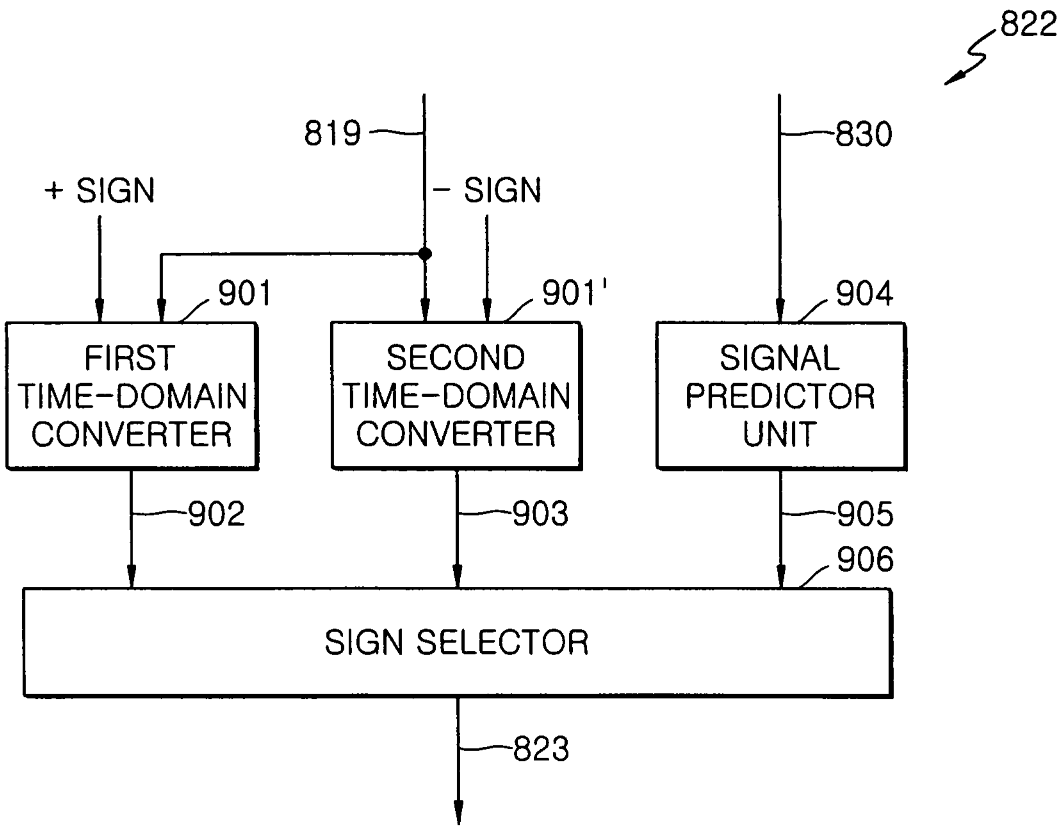
FIG. 9 is a detailed block diagram of a sign predictor module shown in FIG. 8.

The sign predictor module 822 predicts the signs of the first DCT coefficients with small magnitudes to which signs are not assigned from the sign insertion unit 820. The sign predictor module 822 is constructed as shown in FIG. 9. Referring to FIG. 9, the sign predictor module 822 includes a first time-domain converter 901, a second time-domain converter 901', a signal predictor unit 904, and a sign selector 906.

The first time-domain converter 901 inserts positive signs (+) to the magnitudes of the first DCT coefficients received via the line 819 to which signs are not assigned from the sign insertion unit 820, and outputs time-domain information based on the positive sign (+) by performing an inverse DCT.

The second time-domain converter 901' inserts negative signs (−) to the magnitudes of the first DCT coefficients received via the line 819 to which signs are not assigned from the sign insertion unit 820, and outputs time-domain information based on the negative sign (−) by performing an inverse DCT.

In this embodiment, the time-domain converters 901 and 901' output the first sample value of the time-domain signal based on the respective signs, that is, output a sample value obtained by substituting a time index n=0 to the time-domain signal defined by equation 6. In equation 6, L is the number of DCT points. Accordingly, in a case where the DCT with 480 points is performed (see the above description related to the first DCT calculator 301), L can be set to 480.

$$p_m^+[n][k] = |\hat{c}_m[k]|\cos\left(\frac{\pi k(2n+1)}{2L}\right) \qquad (6)$$
$$p_m^-[n][k] = -|\hat{c}_m[k]|\cos\left(\frac{\pi k(2n+1)}{2L}\right)$$

In equation 6, $p_m^+[n][k]$ and $p_m^-[n][k]$ represent sample values at a time index n for a first DCT coefficient of index k in a present frame m, respectively, and $|\hat{c}_m[k]|$ is the magnitude of a first quantized DCT coefficient of index k in a present frame m. The sample values are output via the lines 902 and 903.

In another embodiment of the present invention, the first and second time-domain converters 901 and 901' output gradients at the first sample value of the time-domain signals based on the respective signs, and output values obtained by differentiating a time-domain signal defined by the equation 6 with respect to n and substituting n=0 to the differentiated result.

The signal predictor unit 904 predicts time-domain information for a signal of a present frame for respective frequency indexes from the first quantized DCT coefficients of the previous frame provided via the line 830 from the frame delay unit 829.

The signal predictor unit 904 outputs a value obtained by substituting an index of n=0 to the signal calculated by equation 7 as time-domain prediction information.

$$\hat{p}_m[n][k] = p_{m-1}[n+L][k] = \hat{c}_{m-1}[k]\cos\left(\frac{\pi k(2n+L)+1}{2L}\right) \qquad (7)$$

In equation 7, $\hat{p}_m[n][k]$ is time-domain prediction information for a DCT coefficient index k output via the line 905, and $p_{m-1}[n+L][k]$ is a sample value corresponding to a time index n+L calculated in a previous frame m−1. Since a time index in one frame is from 0 to L−1, $p_{m-1}[n+L][k]$ is a sample value of a present frame obtained in the previous frame.

The sign selector 906 compares the time-domain prediction information predicted for each of the first DCT coefficient indexes received via the line 905 with the actually calculated time-domain information received via the lines 902 and 903, and determines a sign nearest to the prediction information as a final sign of the first DCT coefficient. The final sign of the first DCT coefficient is output via the line 823.

In another embodiment of the present invention, the signal predictor unit 904 predicts a time-domain signal of a present frame using the first quantized DCT coefficients in the previous frame for each DCT coefficient index, and outputs a gradient at index n=0. That is, the signal predictor unit 904 differentiates a signal obtained by equation 7 with respect to n, and outputs a value obtained by substituting n=0 to the differentiated result.

The inverse DCT calculator 824 receives the magnitudes and signs of the first quantized DCT coefficients via the lines 821 and 823 and outputs a time-domain signal quantized for each band using the magnitudes and signs. The time-domain signal quantized for each band is input to the filter bank 826 via the line 825.

The filter bank 826 is constructed in correspondence to the filter bank 201 of FIG. 2. Accordingly, in the filter bank 826, each band is defined by the same center frequency as that defined in the filter bank 201. The filter bank 826 obtains a final speech signal for each band using the quantized time-domain signal for each band, and outputs the final speech signal via the line 827. The adder 828 adds the speech signals for each of the bands transmitted from the filter bank 826, and obtains a finally decompressed high-band speech signal. The decompressed high-band speech signal is output via the line 708.

The filter bank 826 and adder 828 can construct a decompressor, which obtains the speech signals for each of the bands using the quantized signals in the time domain for each of the bands transmitted from the inverse DCT calculator 824, and decompresses a high-band speech signal using the speech signals for each of the bands.

The frame delay device 829 receives the magnitudes and signs of the first DCT coefficients transmitted from the sign insertion unit 820 and the sign predictor module 822, and provides first quantized DCT coefficients, delayed by one frame using the magnitudes and signs of the first DCT coefficients, to the coding module 822. Accordingly, a signal transmitted from the frame delay device 829 via the line 830 is high-band signal information (DCT coefficients) in the previous frame.

The adder 709 adds a decompressed low-band signal of a wide-band and the finally decompressed high-band speech signal received via the line 708 and outputs a wide-band decompressed signal via the line 712.

The method of compressing the low-band speech signal of the wide-band speech signal, according to this embodiment of the present invention, converts the wide-band speech signal into a low-band speech signal of a narrow-band and compresses the low-band speech signal as described with reference to FIG. 1. The compressed low-band speech signal is transmitted as a low-band speech packet. The compressed low-band speech signal includes energy information of the low-band signal.

Figure 10:
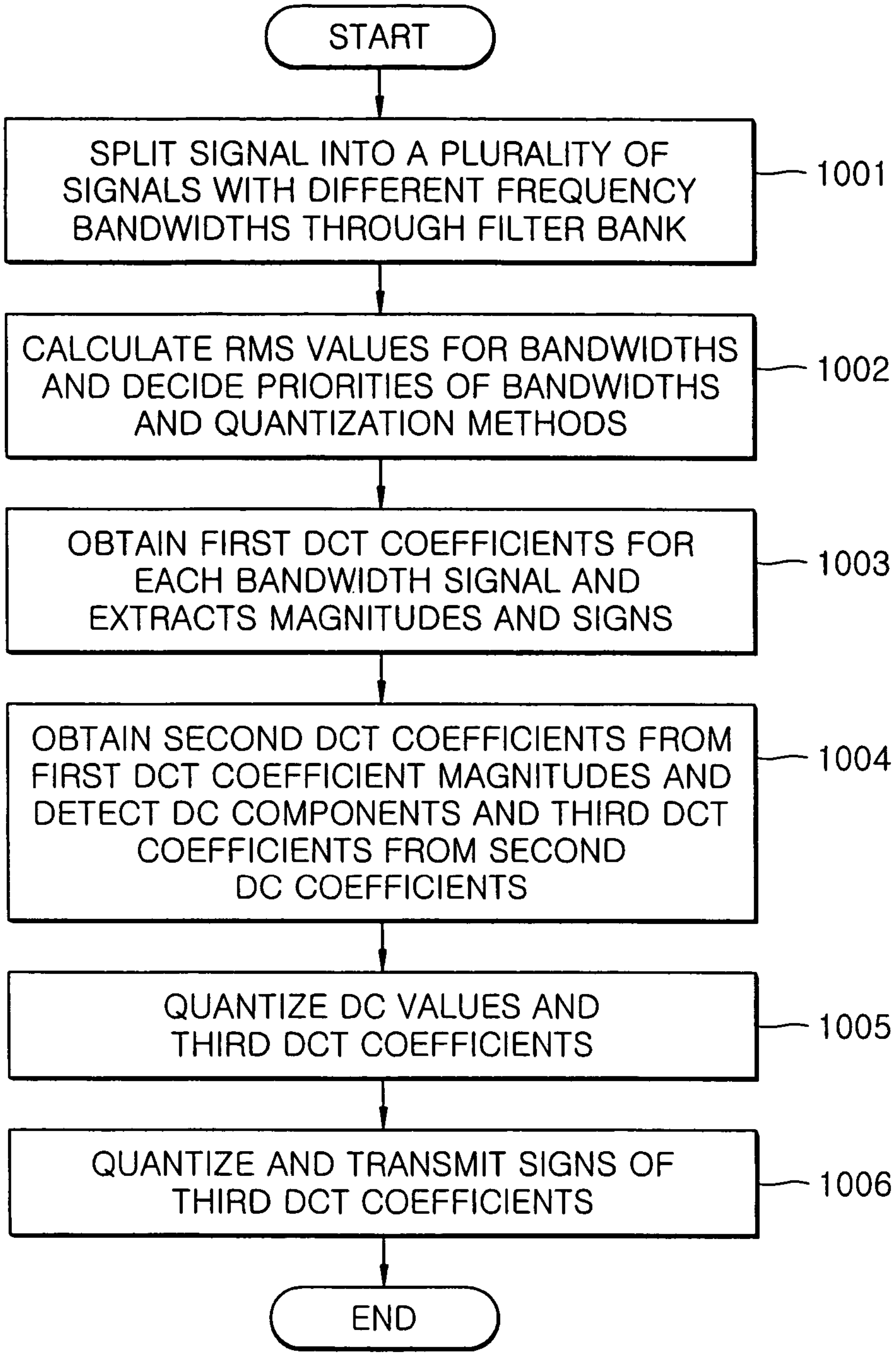
FIG. 10 is a flowchart illustrating a process of compressing a high-band speech signal in a wide-band speech signal compression method according to an embodiment of the present invention.

FIG. 10 is a flowchart illustrating a process for compressing a high-band speech signal in a wide-band speech signal compression method according to an embodiment of the present invention.

If a wide-band speech signal is input to the filter bank 201, the wide-band speech signal is split into a plurality of signals with different frequency bands by the filter bank 201 in operation 1001.

In operation 1002, RMS values for each of the frequency bands are calculated by the RMS calculator 203 of FIG. 2, priorities of the split frequency bands are decided respectively, and a quantization method of each frequency band is determined according to the priorities for each of the frequency bands.

In operation 1003, the plurality of signals with the different frequency bands are subjected to DCT using the band priority information and the energy information of the low-band signal by the band signal quantization module 207 of FIG. 2, thereby obtaining first DCT coefficients. The magnitudes and signs of the first DCT coefficients are extracted independently.

In operation 1004, the magnitudes of the first DCT coefficients are subjected to DCT, thereby obtaining second DCT coefficients. Each of the second DCT coefficients is divided into a DC component (DC value) and a third DCT coefficient.

In operation 1005, the DC value and third DCT coefficient of the second DCT coefficient are quantized independently. At this time, the DC value is quantized using an inter-band prediction method, and the RMS value of the third DCT coefficient is quantized using a quantized DC value by an intra-band prediction quantization method.

In operation 1006, the first DCT coefficient sign is quantized and transmitted. At this time, a sign of a DCT coefficient with a large magnitude is detected and transmitted with reference to the magnitude order information of the first quantized DCT coefficients.

If a low-band speech packet and a high-band speech packet compressed with a scalable bandwidth structure are received, the wide-band speech signal decompression method according to this embodiment of the present invention decompresses a low-band speech packet to a low-band speech signal as seen in FIG. 7, and decompresses the high-band speech packet to the high-band speech signal using the energy information of the decompressed low-band signal obtained when decompressing the low-band speech signal.

Figure 11:
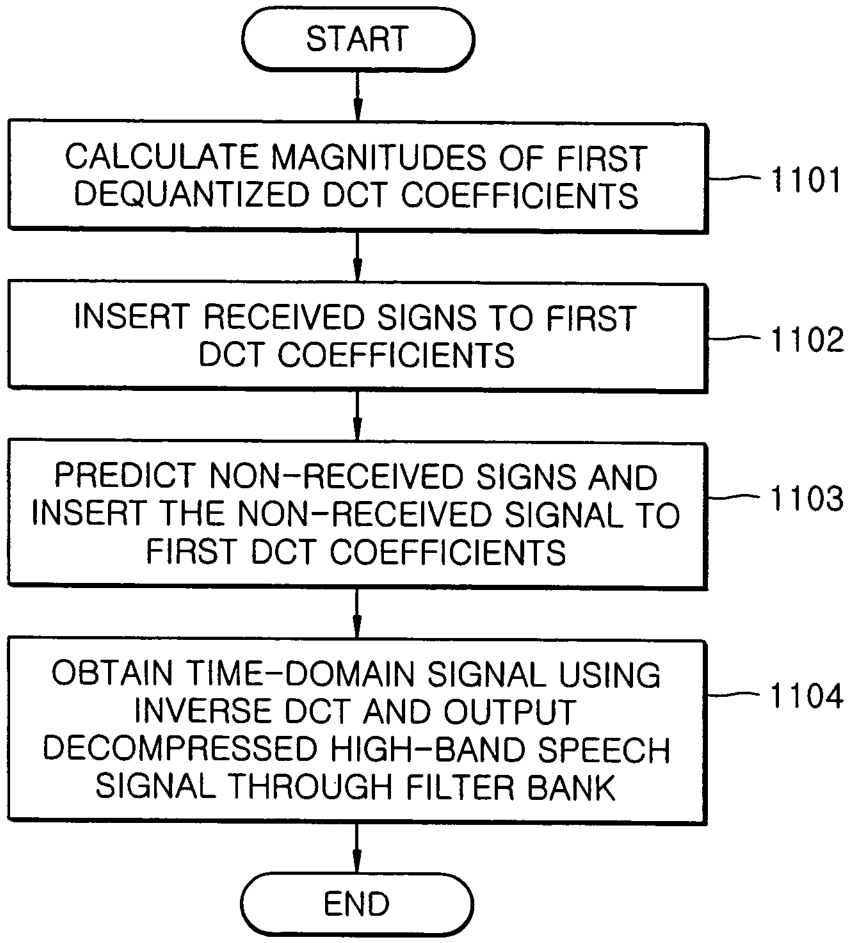
FIG. 11 is a flowchart illustrating a process for decompressing a high-band speech signal in the wide-band speech signal decompression method according to an embodiment of the present invention.

FIG. 11 is a flowchart illustrating a process for decompressing the high-band speech signal using the wide-band speech signal compression method according to this embodiment of the present invention.

If a high-band speech packet is received via a communication channel (not shown), the high-band speech packet received in operation 1101 is dequantized according to the respective modules, and the magnitudes of the first dequantized DCT coefficients are obtained.

In operation 1102, the signs of the received first DCT coefficients are respectively inserted into the corresponding DCT coefficients according to the magnitude order information of the first quantized DCT coefficients, as described in FIG. 8.

In operation 1103, signs of the first DCT coefficients which are not received are predicted by the sign predictor module 822 of FIG. 8, and the predicted signs are inserted into the corresponding first quantized DCT coefficients.

In operation 1104, a time-domain signal for each band is obtained through an inverse DCT for the first quantized DCT coefficients, and a finally decompressed high-band speech signal is output by the filter bank 826 of FIG. 8.

Meanwhile, the high-band speech signal decompressed using the method shown in FIG. 11 is combined with the low-band speech signal decompressed using the method described in FIG. 7 to generate a wide-band decompressed signal.

As described above, according to the present invention, there is provided a wide-band speech signal compression apparatus with a scalable bandwidth structure, compatible with an existing standard narrow-band speech compressor, and a wide-band speech signal decompression apparatus thereof.

Also, according to the present invention, it is possible to improve quantization efficiency by utilizing energy of a low-band signal detected when compressing a high-band speech signal and using correlation of intra-band and inter-band.

Also, according to the present invention, it is possible to efficiently perform quantization and prediction by quantizing DCT coefficients according to their magnitudes and signs, selectively performing quantizations of the signs according to the magnitudes of the DCT coefficients, and predicting non-transmitted signs in decompressing.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus to compress a wide-band speech signal, the apparatus comprising:

a narrow-band speech compressor to compress a low-band speech signal of the wide-band speech signal and output the compressed low-band speech signal as a low-band speech packet; and a high-band speech compressor to compress a high-band speech signal of the wide-band speech signal using energy information of the low-band speech signal provided from the narrow-band speech compressor, and output the compressed high-band speech signal as a high-band speech packet, wherein the high-band speech signal compressor comprises:

a filter bank to split the high-band speech signal of the wide-band speech signal into a plurality of band signals with different frequency bands;

an RMS calculator to calculate RMS values for each of the band signals transmitted from the filter bank;

a band priority decision unit to determine priorities of the band signals split by the filter bank based on the RMS values calculated by the RMS calculator;

a band signal quantization module to quantize the band signals split by the filter bank and output a quantization index for each of the bands using band priority information determined by the band priority decision unit and the energy information of the low-band speech signal; and a packetizer to packetize the band priority information and the quantization index for each band output from the band signal quantization module and output the packetized result as the high-band speech packet, wherein the band signal quantization module performs quantization operations to quantize different numbers of sub-vectors according to the band priority information.

2. The apparatus of claim 1, wherein the energy information of the low-band speech signal is quantized fixed codebook gains of the narrow-band speech compressor, corresponding to a frame of the high-band speech compressor, in response to the narrow band speech compressor being a CELP type compressor.

3. The apparatus of claim 1, wherein the energy information of the low-band speech signal is an average value of quantized fixed codebook gains of the narrow-band speech compressor, corresponding to a frame of the high-band speech compressor, in response to the narrow band speech compressor being a CELP type compressor.

4. The apparatus of claim 1, wherein the band priority decision unit determines the priorities of the band signals according to magnitudes of the RMS values.

5. The apparatus of claim 1, wherein the band priority decision unit assigns a higher priorities to the band signals with greater RMS values.

6. The apparatus of claim 1, wherein the band signal quantization module comprises:

a first DCT calculator to performs a first Discrete Cosine Transform (DCT) on the plurality of band signals provided from the filter bank and obtain first DCT coefficients;

a magnitude extractor to extract magnitudes of the first DCT coefficients;

a sign extractor to extract signs of the first DCT coefficients;

a second DCT calculator to perform a second DCT on the magnitudes of the first DCT coefficients extracted from the magnitude extractor and obtain second DCT coefficients;

a DC divider to divide the second DCT coefficients into DC components and DCT coefficients excluding the DC components and output the DCT coefficients excluding the DC components as third DCT coefficients;

a DC quantization module to quantize the DC components divided by the DC divider;

an RMS value calculator to calculate and output RMS values of the third DCT coefficients;

an RMS value quantization module to quantize the RMS values output by the RMS value calculator;

a normalizer to normalize the third DCT coefficients based on quantized RMS values computed using RMS value quantization indexes output from the RMS value quantization module;

a DCT coefficient quantizer to quantize the normalized third DCT coefficients; and a sign quantization module to quantize the signs of the first DCT coefficients extracted by the sign extractor.

7. The apparatus of claim 6, wherein the DC quantization module quantizes the DC components by inter-band prediction using the energy information of the low-band speech signal and the DC components of each of the band signals.

8. The apparatus of claim 6, wherein the DC quantization module comprises:

an inter-band predictor unit to perform inter-band prediction using the energy information of the low-band speech signal and the DC components of each of the band signals;

a DC quantizer to quantize DC prediction errors output from the inter-band predictor unit and output DC quantization indexes; and a DC dequantizer to obtain the DC prediction errors quantized for each of the band signals from the DC quantization indexes output from the DC quantizer, and obtain DC values quantized for each of the band signals from the DC prediction errors.

9. The apparatus of claim 8, wherein the inter-band predictor unit obtains the DC prediction errors using the equations:

$$\Delta_0 = D_0 - G\hat{g}_c$$

$$\Delta_i = D_i - G\hat{D}_{i-1} \quad i=1, 2, 3 \ldots$$

wherein $D_i$ is a log DC value of an i-th band of high-band speech signal, $\hat{D}_i$ is a quantized log DC value of the i-th band of high-band speech signal, $\hat{g}_c$ is a quantized log energy value of a low-band signal, G is a prediction coefficient in the inter-band predictor unit, and $\Delta_i$ is a DC prediction error of the i-th band of the high-band speech signal.

10. The apparatus of claim 8, wherein the DC quantization module scalar- quantizes the DC prediction errors independently.

11. The apparatus of claim 6, wherein the RMS value quantization module quantizes the RMS values of the third DCT coefficients by intra-band prediction using the quantized DC values of the second DCT coefficients.

12. The apparatus of claim 6, wherein the RMS quantization module comprises:

an intra-band predictor unit to perform intra-band prediction using the RMS values of the third DCT coefficients and the quantized DC values of the second DCT coefficients; and a RMS quantizer to quantize RMS prediction errors obtained by the intra-band predictor unit.

13. The apparatus of claim 12, wherein the intra-band predictor unit obtains the intra-band RMS prediction errors using the equation:

$$\delta_i = s_i - G\hat{D}_i \quad i=0, 1, 2, 3, \ldots$$

wherein, $s_i$ is a log RMS value of the third DCT coefficient at an i-th band of high-band speech signal, $\hat{D}_i$ is a quantized log DC value of the second DCT coefficient at the i-th band of the high-band speech signal, G is a prediction coefficient of the intra-band predictor unit, and $\delta_i$ is an intra-band RMS prediction error value at the i-th band of the high-band speech signal.

14. The apparatus of claim 6, wherein the DCT coefficient quantizer quantizes a predetermined number of the third DCT coefficients for each of the band signals and removes the remaining third DCT coefficients.

15. The apparatus of claim 14, wherein the predetermined number is higher at a band with a higher priority, and the predetermined number is lower at a band with a lower priority, according to the band priority information.

16. The apparatus of claim 6, wherein the DCT coefficient quantizer determines indexes corresponding to a range of the third DCT coefficients to be quantized at each band according to the band priority information, and quantizes the third DCT coefficients for each band with reference to the determined indexes.

17. The apparatus of claim 6, wherein the DCT coefficient quantizer determines indexes corresponding to a range of the third DCT coefficients to be quantized at each band according to the band priority information, removes the third DCT coefficients lower than the determined indexes of the third DCT coefficients, and quantizes the remaining third DCT coefficients.

18. The apparatus of claim 6, wherein the DCT coefficient quantizer performs quantization using a split vector quantization method, which splits the third DCT coefficients to be quantized at each band into a plurality of subvectors, and selects subvectors to be quantized and subvectors to be removed among the plurality of subvectors.

19. The apparatus of claim 6, wherein the sign quantization module detects magnitude order information of the first DCT coefficients using quantized indexes of the third DCT coefficients and DC quantization indexes of the second DCT coefficients, and quantizes the signs of the first DCT coefficients according to the magnitude order information of the first DCT coefficients.

20. The apparatus of claim 19, wherein the sign quantization module divides signs of the first DCT coefficients into signs of the first DCT coefficients to be quantized and signs of the first DCT coefficients to be removed, and quantizes signs of the first DCT coefficients to be quantized using the magnitude order information of the first DCT coefficients.

21. The apparatus of claim 20, wherein the signs of the first DCT coefficients to be quantized comprise a predetermined number of the signs of the first DCT coefficients in a descending order starting from a first DCT coefficient with a maximum magnitude.

22. The apparatus of claim 6, wherein the sign quantization module comprises:

a DCT coefficient dequantizer to obtain dequantized third DCT coefficients from quantized indexes of the third DCT coefficients;

a DC dequantizer to obtain dequantized DC values of the second DCT coefficients from DC quantized indexes of the second DCT coefficients;

an inverse DCT calculator to perform an inverse DCT on the dequantized third DCT coefficients and the dequantized DC values of the second DCT coefficients;

an arrangement unit to arrange magnitudes of quantized first DCT coefficients output from the inverse DCT calculator in a descending order of the magnitudes; and a sign quantizer to quantize signs of the first DCT coefficients according to magnitude order information of the quantized first DCT coefficients output from the arrangement unit.

23. The apparatus of claim 22, wherein the sign quantizer quantizes signs corresponding to a predetermined number of the first DCT coefficients in the descending order starting from a first DCT coefficient with a maximum magnitude on the basis of the magnitude order information of the quantized first DCT coefficients output from the arrangement unit, and removes the signs of the remaining quantized first DCT coefficients.

24. The apparatus of claim 1, further comprising a first band conversion unit to convert the wide-band speech signal into a low-band speech signal of a narrow-band and provide the low-band speech signal of the narrow-band to the narrow-band speech compressor.

25. An apparatus to decompress a wide-band speech signal, the wide-band speech signal including a compressed low-band speech packet and a compressed high-band speech packet, the apparatus comprising:

a narrow-band speech decompressor to decompress the compressed low-band speech packet into a low-band speech signal;

a high-band speech decompressor to decompress the compressed high-band speech packet into a high-band speech signal using energy information of the decompressed low-band speech signal provided from the narrow-band speech decompressor; and an adder to add the low-band speech signal output from the narrow-band speech decompressor with the high-band speech signal output from the high-band speech decompressor and output the decompressed wide-band speech signal, wherein the high-band speech decompressor comprises:

an inverse packetizer to split the high-band speech packet according to modules included in the apparatus;

a sign dequantizer to dequantize signs output from the inverse packetizer;

an inverse DCT calculation module to perform dequantizations respectively with reference to band priority information, third DCT quantization indexes, DC quantization indexes of second DCT coefficients, and RMS quantization indexes of third DCT coefficients, which are output from the inverse packetizer, to obtain quantized second DCT coefficients, and obtain magnitudes of quantized first DCT coefficients from the quantized second DCT coefficients;

an arrangement unit to arrange magnitudes of the quantized first DCT coefficients output from the inverse DCT calculation module in descending order and output magnitude order information of the quantized first DCT coefficients;

a sign insertion unit to insert signs of the first DCT coefficients obtained from the high-band speech packet to the magnitudes of the first DCT coefficients, based on the magnitude order information of the first DCT coefficients;

a sign predictor module to predict signs which were not transmitted based on the magnitude order information of the first DCT coefficients provided from the arrangement unit, and inserts the predicted signs to the corresponding first DCT coefficient magnitudes;

an inverse DCT calculator to convert the sign-inserted first DCT coefficients output from the sign insertion unit and the sign predictor module into quantized time-domain signals, according to each of a plurality of bands; and a decompressor to obtain speech signals for each of the bands using the quantized time-domain signals for each of the bands output from the inverse DCT calculator, and decompress the high-band speech signals using the speech signals for each of the bands.

26. The apparatus of claim 25, wherein the sign insertion unit inserts a predetermined number of the signs of the first DCT coefficients to the quantized first DCT coefficients in the descending order starting from a first quantized DCT coefficient with a maximal magnitude, using the magnitude order information of the first quantized DCT coefficients.

27. The apparatus of claim 25, wherein the sign predictor module predicts signs of first DCT coefficients which were not inserted by the sign insertion unit, and inserts the predicted signs to the corresponding first DCT coefficients.

28. The apparatus of claim 25, wherein the sign predictor module comprises:

a plurality of time-domain converters to insert a positive sign and a negative sign respectively to each of indexes of first DCT coefficients of which signs were not inserted, and output time-domain information for respective signs of respective coefficient indexes using an inverse DCT;

a signal predictor unit to output time-domain prediction information in a present frame for each of the indexes of the DCT coefficients of which signs were not inserted, using high-band signal information in a previous frame for each of indexes of the first DCT coefficients; and a sign selector that compares time-domain information obtained using the positive sign and the negative sign of the each of indexes of the DCT coefficients, with the time-domain prediction information, and determines a final sign for the each of indexes of the DCT coefficients.

29. The apparatus of claim 28, wherein the plurality of time-domain converters obtain a time-domain signal for each sign using the equations:

$$p_m^+[n][k] = |\hat{c}_m[k]|\cos\left(\frac{\pi k(2n+1)}{2L}\right)$$

$$p_m^-[n][k] = -|\hat{c}_m[k]|\cos\left(\frac{\pi k(2n+1)}{2L}\right),$$

and output values obtained by substituting n=0 into the above equations, wherein $P_m^+[n][k]$ and $p_m^-[n][k]$ represent sample values at a time index n for a first DCT coefficient index k in a present frame m, respectively, and $|\hat{c}_m[k]|$ is a magnitude of a first quantized DCT coefficient in a present frame m.

30. The apparatus of claim 28, wherein the plurality of time-domain converters output a gradient at n=0 by differentiating the following equation with respect to n and substituting n=0 to an equation:

$$p_m^+[n][k] = |\hat{c}_m[k]|\cos\left(\frac{\pi k(2n+1)}{2L}\right)$$

$$p_m^-[n][k] = -|\hat{c}_m[k]|\cos\left(\frac{\pi k(2n+1)}{2L}\right),$$

wherein $p_m^+[n][k]$ and $p_m^-[n][k]$ represent sample values at a time index n for a first DCT coefficient index k in a present frame m, respectively, and $|\hat{c}_m[k]|$ is a magnitude of a first quantized DCT coefficient.

31. The apparatus of claim 28, wherein the signal predictor unit outputs prediction information by predicting a time-domain signal in a present frame from DCT coefficients in a previous frame for each of the DCT coefficients using the following equation and substituting n=0 into the following equation:

$$\hat{p}_m[n][k] = p_{m-1}[n+L][k] = \hat{c}_{m-1}[k]\cos\left(\frac{\pi k(2(n+L)+1)}{2L}\right),$$

wherein $\hat{p}_m[n][k]$ is a time-domain prediction signal for a DCT coefficient index k, $p_{m-1}[n+L][k]$ is a signal corresponding to a time index n+L in a previous frame m−1, and $\hat{c}_{m-1}[k]$ is a first quantized DCT coefficient in the previous frame.

32. The apparatus of claim 28, wherein the signal predictor unit outputs a predicted gradient at n=0 by differentiating the following equation with respect to n and substituting n=0 into the equation:

$$\hat{p}_m[n][k] = p_{m-1}[n+L][k] = \hat{c}_{m-1}[k]\cos\left(\frac{\pi k(2(n+L)+1)}{2L}\right),$$

wherein $\hat{p}_m[n][k]$ is a time-domain prediction signal for a DCT coefficient index k, $p_{m-1}[n+L][k]$ is a signal corresponding to a time index n+L in a previous frame m−1, and $\hat{c}_{m-1}[k]$ is a first quantized DCT coefficient in the previous frame.

33. The apparatus of claim 28, wherein the sign selector selects a sign nearest to the time-domain prediction information output from the signal predictor unitas a final sign.

34. A method of compressing a wide-band speech signal, the method comprising:

receiving the wide-band speech signal and compressing a high-band speech signal of the wide-band speech signal using energy of a low-band signal of the wide-band speech signal; and outputting the compressed high-band speech signal as a high-band speech packet, wherein the compressing of the high-band speech signal comprises:

splitting the high-band speech signal of the wide-band speech signal into a plurality of band signals with different frequency bands;

determining a priority for the plurality of band signals; and quantizing the plurality of band signals according to the determined priority, wherein the quantizing of each band comprises:

applying DCT to each of the plurality of band signals and obtaining first DCT coefficients;

extracting magnitudes and signs of the first DCT coefficients individually;

applying DCT to the magnitudes of the first DCT coefficients and obtaining second DCT coefficients;

dividing the second DCT coefficients into DC components and DCT coefficients excluding the DC components and setting the DCT coefficients excluding the DC components as third DCT coefficients;

calculating RMS values of the third DCT coefficients; and respectively quantizing the DC components, the RMS values of the third DCT coefficients, the third DCT coefficients, and the signs of the first DCT coefficients.

35. The method of claim 34, wherein the energy of the low-band signal is generated by narrow-band speech compressing of the low-band signal of the wide-band speech signal.

36. The method of claim 34, wherein the determination of the priority is based on RMS values for the plurality of band signals.

37. The method of claim 36, wherein the determination of the priority is performed so that a higher priority is assigned to a band with a greater value of the RMS values.

38. The method of claim 34, wherein the respectively quantizing of the DC components, the RMS values of the third DCT coefficients, the third DCT coefficients, and the signs of the first DCT coefficients comprises:

quantizing the DC components using inter-band prediction quantization;

quantizing the RMS values of the third DCT coefficients using intra-band prediction quantization;

quantizing the third DCT coefficients so that a predetermined number of the third DCT coefficients of each band are quantized, and the remaining third DCT coefficients are removed; and quantizing the signs of the first DCT coefficients according to magnitudes of the first DCT coefficients.

39. The method of claim 38, wherein the inter-band prediction quantization for the DC components obtains inter-band DC prediction errors according to the equation:

$$\Delta_0 = D_0 - G\hat{g}_c$$

$$\Delta_i = D_i - G\hat{D}_{i-1},\ i=1, 2, 3, \ldots, \qquad (1)$$

and quantizes the inter-band DC prediction errors, wherein $D_i$ is a log DC value at an i-th band of high-band speech signal, $\hat{D}_i$ is a quantized log DC value at the i-th band of high-band speech signal, $\hat{g}_c$, is a log energy of a low-band signal, G is a prediction coefficient of the predictor unit, and $\Delta_i$ is a DC prediction error of the i-th band of the high-band speech signal.

40. The method of claim 38, wherein the quantizing the RMS values of the third DCT coefficients using the intra-band prediction quantization comprises using the RMS values of the third DCT coefficients and quantized DC values of the second DCT coefficients.

41. The method of claim 38, wherein quantizing the predetermined number of third DCT coefficients of each band quantized is higher in response to the band having a high priority, and lower in response to the band having a low priority.

42. The method of claim 38, wherein the quantizing the signs of the first DCT coefficients comprises quantizing a predetermined number of the signs of the first DCT coefficients in a descending order of magnitude from a first DCT coefficient with a maximum magnitude, and removes the signs of the remaining first DCT coefficients.

43. A method of decompressing a compressed wide-band speech signal having a high-band speech packet and a low-band speech packet compressed with a scalable bandwidth structure, the method comprising:

decompressing the low-band speech packet into a low-band speech signal;

decompressing the high-band speech packet into a high-band speech signal using energy information of the decompressed low-band speech signal obtained in the decompressing of the low-band speech signal; and adding the low-band speech signal with the high-band speech signal and generating a wide-band decompression signal, wherein the decompressing of the high-band speech signal comprises:

dequantizing the high-band speech packet according to modules for decompressing the wide-band speech signal;

extracting magnitudes of first DCT coefficients dequantized by the dequantization;

extracting signs of the first DCT coefficients generated by the dequantization;

inserting the signs of the first DCT coefficients to the first DCT coefficients according to magnitude order information for the first dequantized DCT coefficients;

predicting signs of the first DCT coefficients which are not received using the magnitude order information of the first dequantized DCT coefficients and first dequantized DCT coefficients in a previous frame;

inserting the predicted signs of the first DCT coefficients to the corresponding first dequantized DCT coefficients; and applying inverse DCT to the corresponding first dequantized DCT coefficients, obtaining a time-domain signal for each band, and outputting the high-band speech signal.

* * * * *

UNITED STATES PATENT AND TRADEMARK OFFICE

CERTIFICATE OF CORRECTION

PATENT NO. : 8,433,565 B2
APPLICATION NO. : 10/891423
DATED : April 30, 2013
INVENTOR(S) : Woo-suk Lee et al.

It is certified that error appears in the above-identified patent and that said Letters Patent is hereby corrected as shown below:

In the Specification

In Col. 1, Line 11, delete “reference” and insert -- reference. --, therefor.

In the Claims

In Col. 16, Line 60, In Claim 10, delete “scalar- quantizes” and insert -- scalar-quantizes --, therefor.

In Col. 20, Line 43, In Claim 32, delete “for a” and insert -- for a first --, therefor.

In Col. 20, Line 50, In Claim 33, delete “unitas a” and insert -- unit as a --, therefor.

In Col. 21, Line 51, In Claim 39, delete “$\hat{g}_c$,” and insert -- $\hat{g}_c$ --, therefor.

Signed and Sealed this
Fifteenth Day of October, 2013

Teresa Stanek Rea
*Deputy Director of the United States Patent and Trademark Office*